C. W. KINYON & A. T. BROWN.
MILK-COOLER.

No. 186,482.    Patented Jan. 23, 1877.

UNITED STATES PATENT OFFICE.

CHARLES W. KINYON AND ALEXANDER T. BROWN, OF SCOTT, NEW YORK.

IMPROVEMENT IN MILK-COOLERS.

Specification forming part of Letters Patent No. 186,482, dated January 23, 1877; application filed December 8, 1876.

*To all whom it may concern:*

Be it known that we, CHARLES W. KINYON and ALEXANDER T. BROWN, of the town of Scott, in the county of Cortland and State of New York, have jointly invented a new and useful Improvement in Milk Pans and Coolers, which improvement is fully set forth in the following specification, reference being had to the accompanying drawing.

Our invention relates to that class of milk-pans which are set in vats and cooled with cold water. A set of vats, four in number, fastened together, and forming at the upper surface a rectangle, are mounted upon legs for the reception of the pans. Tin pans corresponding to the size of these vats are placed in them, with the rim of the pans resting upon the upper edges of the vats, and supported underneath by a few rounded or beveled cross-pieces placed in the bottom of the vats.

Figure 1:
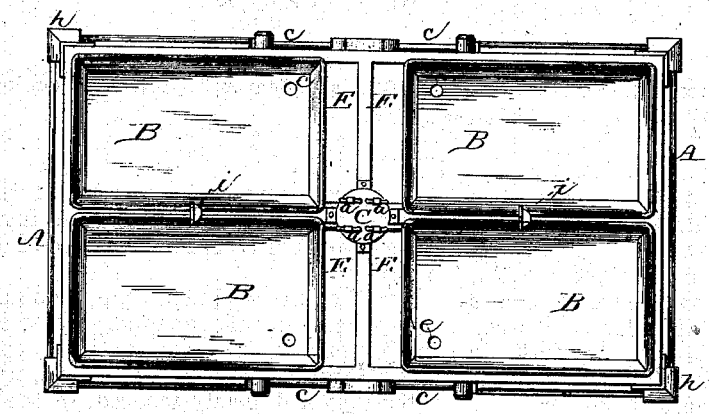
Figure 2:
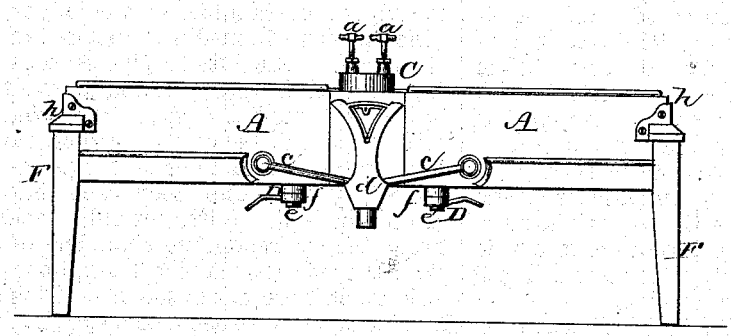
Figure 3:
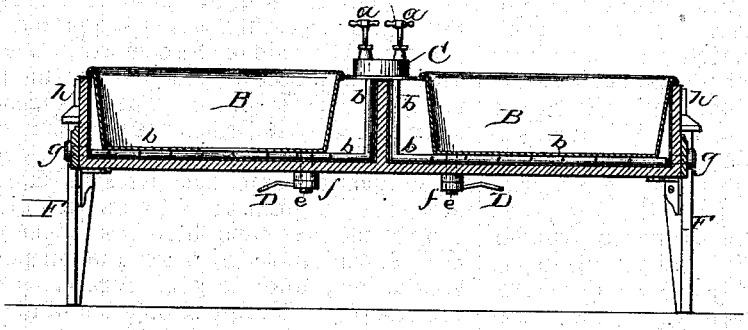

In the drawing, Figure 1 represents a plan view, looking down upon the top of the pans placed in the vats. Fig. 2 represents a side view of the vats containing the pans. Fig. 3 represents a longitudinal section.

A A represent the vats, and B B the pans. At the center or common corner of the four vats, water is introduced through a pipe into a common cylinder, C. This cylinder is provided with four stop-cocks, $a$ $a$, and outlet-pipes, $b$ $b$, each one of which runs down into its respective vat to the bottom, and extends along the inside lower edge of the vat to the opposite end. Each of these pipes has perforations along the whole length of the pan, so that when water is turned on by means of the stop-cock into any one of the vats, it is distributed with a uniform temperature under the whole of the pan. To regulate the depth of the water, and to supply an outlet thereto, an adjustable lateral pipe, $c$, is introduced into the outside and at the bottom of each vat. This pipe is so arranged that it can be raised and lowered, and will remain in place at any altitude. This discharge-pipe can be raised to any point on the side of the vat up to which it may be desired to fill the vat with water, and as the water flowing in reaches the desired height in the vat, it commences to flow out through the pipe $c$, and cannot rise higher than the desired point. These discharge-pipes $c$ $c$ are so located that the water flowing out falls into a tunnel, $d$, fastened to the sides of the vats, and is carried off through a pipe.

For the purpose of emptying the milk from the pans, a discharge-pipe, $e$, is secured to the bottom of each pan, and extends downward through the vat. A short pipe, $f$, is fitted into and firmly secured to the bottom of the vat, and the discharge-pipe $e$ extends through the short pipe $f$. The short pipe $f$ has a projecting shoulder rising a little above the bottom of the vat, upon which rests a corresponding shoulder of the longer pipe $e$, which projects immediately below the bottom of the pan. The outside pipe or socket $f$ has four or more flanges running down through it, with grooves between. The discharge-pipe extends a little below the socket, closely fitting against the flanges, and has two small projecting ears, one upon each side of the projecting end. With suitable packing between the corresponding shoulders of the two pipes they may be made water-tight to prevent leakage of water out of the vat. This is done by means of a wrench or cam, D, so constructed that it may be slipped over the end of the pipe $e$, and up against the socket $f$, having two small inside grooves corresponding to the projecting ears of the pipe $e$.

Upon the inside of the cam are two flanges, each running half-way around on the principle of an inclined plane. These flanges catch upon the ears, and when the wrench is turned operate like the thread of a screw, drawing down upon the ears and pressing the shoulders firmly together. Between the adjoining ends of the four pans there is an open space, E E, down into the vats for the purposes of ventilation; and to still further promote ventilation, and a free circulation of air when water is not being used, orifices $g$ $g$, of sufficient number, are made through the remote or outer ends of the vats, which may be kept closed with caps or plugs when desired.

If it is desired to warm the milk in the pans, this may be done by the introduction of warm water into the vats by the method already described, or by introducing hot air through the orifices $g$ $g$. The pans are still further held firmly in place by the small button $i$, secured to the upper edge of the inside partitions of the vats, and so made as to hold either one or two pans at the same time, as may be desired.

Another useful feature of our invention is that the legs F F are not permanently secured to the vats, but may be taken off and put on at pleasure, their upper ends being set in sockets $h\ h$, secured to the vats. Thus they may be made to occupy much less room when being shipped or not in use.

We claim—

1. The pans B in vats A, with common cylinder C, and stop-cocks controlling perforated distributing-tubes, arranged as shown and described.

2. The pans B and vats A, with movable discharging-pipes $c$ and confluent tunnel $d$, substantially as arranged and described.

3. The pans B vats A, distributing perforated pipes $b$, and discharge-nozzles $f$ and $e$, and tightening-cams D, arranged as described.

4. A cooler with pans B, held in vats A by a half headed button, $i$, and with ventilators $g$, as arranged and described.

CHARLES W. KINYON.
ALEXANDER T. BROWN.

Witnesses:
MORGAN L. WEBB,
BENJ. L. WEBB.